(12) United States Patent
Inoue et al.

(10) Patent No.: US 12,537,185 B2
(45) Date of Patent: Jan. 27, 2026

(54) POSITIVE ELECTRODE FOR ALKALINE BATTERIES, AND ALKALINE BATTERY AND METHOD FOR PRODUCING THE SAME

(71) Applicant: Maxell, Ltd., Kyoto (JP)

(72) Inventors: Yusuke Inoue, Kyoto (JP); Yoshihisa Hirose, Kyoto (JP); Takahiro Furutani, Kyoto (JP)

(73) Assignee: MAXELL, LTD., Kyoto (JP)

( * ) Notice: Subject to any disclaimer, the term of this patent is extended or adjusted under 35 U.S.C. 154(b) by 653 days.

(21) Appl. No.: 17/780,116

(22) PCT Filed: Nov. 24, 2020

(86) PCT No.: PCT/JP2020/043570
§ 371 (c)(1),
(2) Date: May 26, 2022

(87) PCT Pub. No.: WO2021/106829
PCT Pub. Date: Mar. 6, 2021

(65) Prior Publication Data
US 2022/0416227 A1    Dec. 29, 2022

(30) Foreign Application Priority Data

Nov. 28, 2019  (JP) .................................. 2019-214854
Jan. 29, 2020  (JP) .................................. 2020-012747
Mar. 30, 2020  (JP) .................................. 2020-059937

(51) Int. Cl.
*H01M 4/00*  (2006.01)
*H01M 4/34*  (2006.01)
(Continued)

(52) U.S. Cl.
CPC ............. *H01M 4/364* (2013.01); *H01M 4/34* (2013.01); *H01M 4/38* (2013.01); *H01M 4/54* (2013.01);
(Continued)

(58) Field of Classification Search
CPC ........ H01M 4/36; H01M 10/26; H01M 10/28; H01M 4/34; H01M 4/54; H01M 4/38
See application file for complete search history.

(56) References Cited

U.S. PATENT DOCUMENTS

| 3,650,832 A  | * | 3/1972  | Tvarusko ............. H01M 10/32 |
|              |   |         | 429/207 |
| 4,338,385 A  |   | 7/1982  | Ohya et al. |
| 2015/0024247 A1 | * | 1/2015  | Lockett ................. H01M 10/26 |
|              |   |         | 29/623.5 |
| 2019/0355990 A1 |   | 11/2019 | Inoue et al. |

FOREIGN PATENT DOCUMENTS

| GB | 1178918 A | * | 1/1970 | ............ H01M 10/26 |
| JP | 50-157837 A | | 12/1975 | |

(Continued)

OTHER PUBLICATIONS

Tvarusko, Alkaline Electric Batteries Employing Divalent Silver Oxide Active Material, Feb. 1967, See the Abstract. (Year: 1967).*

(Continued)

*Primary Examiner* — Tiffany Legette
*Assistant Examiner* — Monique M Wills
(74) *Attorney, Agent, or Firm* — WHDA, LLP (57) ABSTRACT

The alkaline battery of the present invention includes, as power generation components, a positive electrode containing silver oxide as a positive electrode active material, a negative electrode, a separator, and an alkaline electrolyte solution. At least one of the power generation components contains tellurium or a compound of tellurium. The total content of tellurium element contained in components housed in the battery is 0.4 parts by mass or more with respect to 100 parts by mass of the total amount of silver element in the positive electrode active material. The positive electrode is substantially free of cadmium.

10 Claims, 1 Drawing Sheet

(51) Int. Cl.
*H01M 4/36* (2006.01)
*H01M 4/38* (2006.01)
*H01M 4/54* (2006.01)
*H01M 10/26* (2006.01)
*H01M 10/28* (2006.01)
*H01M 4/02* (2006.01)

(52) U.S. Cl.
CPC ........... *H01M 10/26* (2013.01); *H01M 10/28* (2013.01); *H01M 2004/028* (2013.01); *H01M 2300/0014* (2013.01)

(56) References Cited

FOREIGN PATENT DOCUMENTS

| | | | | | |
|---|---|---|---|---|---|
| JP | 52132348 | A | * | 11/1977 | ............ H01M 10/26 |
| JP | 55-104074 | A | | 8/1980 | |
| JP | 57-11823 | A | | 1/1982 | |
| JP | 57-132675 | A | | 8/1982 | |
| WO | WO-2005015662 | A2 | * | 2/2005 | ............ H01M 10/24 |

OTHER PUBLICATIONS

Jiyoozefu, Lithium Battery, Nov. 1995, See the Abstract. (Year: 1995).*
Boone et al., Electrochemical Cell Comprises Anode, Cathode Comprising Cathode Active Material, Layer(s) Of Separator Of Preset Exclusion Value, Provided Between Anode And Cathode, And Alkaline Aqueous Bulk Electrolyte, Feb. 2005, See the Abstract. (Year: 2005).*
International Search Report dated Jan. 26, 2021, issued in counterpart International Application No. PCT/JP2020/043570 (2 pages).
Extended (Supplementary) European Search Report dated Dec. 2, 2022, issued in counterpart EP application No. 20891663.5. (11 pages).

* cited by examiner

POSITIVE ELECTRODE FOR ALKALINE BATTERIES, AND ALKALINE BATTERY AND METHOD FOR PRODUCING THE SAME

TECHNICAL FIELD

The present invention relates to a positive electrode applicable to alkaline batteries in which silver oxide is used as a positive electrode active material, and to an alkaline battery and a method for producing the same.

BACKGROUND ART

Alkaline batteries that use silver oxide as a positive electrode active material and have an alkaline electrolyte are in widespread use as primary batteries. In addition, alkaline batteries with the above-described configuration are also considered fir practical use of secondary batteries.

Various improvements have been made in such alkaline batteries. For example, Patent Document 1 discloses, regarding silver peroxide [silver(II) oxide, AgO] for batteries, which exhibits low stability in a potassium hydroxide electrolyte solution and generates oxygen, that the generation of oxygen can be suppressed by adding a predetermined amount of cadmium component and a predetermined amount of tellurium component to the silver peroxide.

CITATION LIST

Patent Document

Patent Document 1: JP 57(1982)-11823A

DISCLOSURE OF INVENTION

Problem to be Solved by the Invention

However, since the use of cadmium imposes a heavy burden on the environment, the configuration disclosed in Patent Document 1 cannot be applied to alkaline batteries as it is. On the other hand, in alkaline batteries in which silver oxide is used as a positive electrode active material, further improvement in characteristics is required as both primary batteries and secondary batteries, and studies to this end are currently in progress.

The present invention was made in light of the foregoing, and it is a first object of the present invention to provide a positive electrode for alkaline batteries, capable of improving charge-discharge cycle characteristics, an alkaline battery with excellent charge-discharge cycle characteristics, and a method for producing the same.

It is a second object of the present invention to provide a positive electrode for alkaline batteries, capable of reducing the internal resistance, an alkaline battery with a reduced internal resistance, and a method for producing the same.

Solution to Problem

The present invention provides a positive electrode for alkaline batteries, containing: silver oxide as a positive electrode active material, wherein the positive electrode contains tellurium or a compound of tellurium, the content of tellurium element in the positive electrode is 0.4 parts by mass or more with respect to 100 parts by mass of the total amount of silver element in the positive electrode active material, and the positive electrode is substantially free of cadmium.

The present invention also provides an alkaline battery including, as power generation components: a positive electrode containing silver oxide as a positive electrode active material; a negative electrode; a separator; and an alkaline electrolyte solution, wherein at least one of the power generation components contains tellurium or a compound of tellurium, the total content of tellurium element contained in components housed in the battery is 0.4 parts by mass or more with respect to 100 parts by mass of the total amount of silver element in the positive electrode active material, and the positive electrode is substantially free of cadmium.

The present invention also provides a method for producing the alkaline battery according to the present invention, wherein the positive electrode for alkaline batteries according to the present invention is used as the positive electrode.

Furthermore, in another embodiment of the method for producing the alkaline battery according to the present invention, an alkaline electrolyte solution in which tellurium or a compound of tellurium is dissolved is used as the alkaline electrolyte solution.

Advantageous Effects of Invention

According to one aspect, the present invention can improve the charge-discharge cycle characteristics of an alkaline battery. According to another aspect, the present invention can reduce the internal resistance of an alkaline battery.

DESCRIPTION OF THE INVENTION

The positive electrode for alkaline batteries according to the present invention (hereinafter may be simply referred to as "positive electrode") is a positive electrode for alkaline batteries, containing silver oxide as a positive electrode active material. The positive electrode contains tellurium (Te) or a compound thereof. The content of tellurium element in the positive electrode is 0.4 parts by mass or more with respect to 100 parts by mass of the total amount of silver element in the positive electrode active material. The positive electrode is substantially free of cadmium.

As disclosed in Patent Document 1, when $TeO_2$ alone is added to silver(II) oxide, the amount of oxygen generated in a potassium hydroxide electrolyte solution increases compared with the case where silver(II) oxide is used alone (Test Nos. 1 and 2 in Table 1 on page 3). Thus, in Patent Document 1, a predetermined amount of cadmium component and a predetermined amount of tellurium component are added in combination to avoid the above-described problem.

However, the inventors of the present invention have found through studies that, when a predetermined amount of tellurium or a compound thereof is contained in, for example, at least one of the power generation components (i.e., a positive electrode, a negative electrode, a separator, and an alkaline electrolyte solution), or especially in the positive electrode, an effect of reducing the internal resistance of the battery or an effect of improving the charge-discharge cycle characteristics of the battery can be attained even if cadmium (Cd) is not contained in the positive electrode.

Also, it was found that, when silver(I) oxide is contained as a positive electrode active material, and especially when the proportion of the silver(I)oxide in silver oxide is high, the problem caused by the generation of oxygen as disclosed in Patent Document 1 does not become tangible.

Tellurium or a compound thereof may be contained in anyone of the power generation components, for example. However, in the case where tellurium or a compound thereof is contained in the negative electrode or the separator, it is speculated that these additives are once dissolved in the alkaline electrolyte solution, then migrate to the positive electrode, and thereafter act on the silver oxide (positive electrode active material) to reduce the internal resistance of the battery or to improve the charge-discharge cycle characteristics when the battery is a secondary battery.

Therefore, it is preferable to dissolve tellurium or a compound thereof in an alkaline electrolyte solution in advance and assemble an alkaline battery using the thus-prepared alkaline electrolyte solution.

Furthermore, it is more preferable that tellurium or a compound thereof is contained in the positive electrode, because these additives can act directly in the positive electrode after being dissolved in the alkaline electrolyte solution and thus can efficiently exhibit their functions.

The content of tellurium or a compound thereof may be adjusted such that the total content of tellurium element contained in components housed in the battery is 0.4 mass parts or more with respect to 100 parts by mass of the total amount of silver element in the positive electrode active material. When the housed components are the power generation components only, the content of tellurium or a compound thereof may be adjusted such that the total of the contents of the tellurium element retained in the respective power generation components falls within the above range. In other words, the total of the amount of the tellurium element retained in a dissolved state in the electrolyte solution and the amount of the tellurium element contained in the tellurium or the compound thereof retained in such a state in contact with the electrolyte solution to become dissolvable in the electrolyte solution may be adjusted to fall within the above range.

Specific examples of the additives to be contained in the power generation components can include: tellurium (metal tellurium); oxides of tellurium, such as tellurium dioxide and tellurium trioxide; telluric acid and salts thereof (such as lithium salt and sodium salt); and tellurous acid and salts thereof (such as sodium salt, potassium salt, and barium salt).

In the following, the configuration of the present invention will be described in detail.

Positive Electrode for Alkaline Batteries

A positive electrode for alkaline batteries may be, for example, a molded body of a positive electrode mixture that contains a positive electrode active material and a conductive assistant, or may have a structure in which a layer (positive electrode mixture layer) that contains a positive electrode mixture containing a positive electrode active material and a conductive assistant is formed on one surface or both surfaces of a current collector.

The silver oxide as the positive electrode active material may be, for example, silver(I) oxide such as $Ag_2O$ or silver(II) oxide such as AgO, or may be a complex oxide. Alternatively, the silver oxide may be a mixture with another silver oxide such as silver(I)oxide or silver(II) oxide. However, in order to enhance the stability of the positive electrode active material, the proportion of silver(I) oxide in the total amount of silver oxide contained in the positive electrode (in the total amount of silver oxide in the positive electrode mixture) is preferably 60 mass % or more and more preferably 85 mass % or more. Since the silver oxide may consist of silver(I) oxide, the upper limit of the proportion of silver(I) oxide in the total amount of the silver oxide contained in the positive electrode (in the total amount of the silver oxide in the positive electrode mixture) is 100 mass %.

In the present invention, since cadmium need not be contained in the positive electrode, the positive electrode can be substantially free of cadmium. The phrase "substantially free of cadmium" as used herein means that the content of cadmium (Cd) is 0.1 parts by mass or less with respect to 100 parts by mass of the total amount of silver element in the positive electrode active material. However, from the viewpoint of environmental burden, it is preferable to use a positive electrode active material that does not contain Cd at all or in which the content of Cd so small that it can be regarded as impurities.

Although there is no particular limitation on the particle size of the silver oxide, the silver oxide has an average particle diameter of preferably 10 μm or less and more preferably 2 μm or less. Use of silver oxide with such a size improves the utilization rate during charging in particular when the positive electrode is applied to a secondary battery.

However it is difficult to produce and handle silver oxide if its particle diameter is too small. Thus, the average particle diameter of the silver oxide is preferably 0.01 μm or more and more preferably 0.03 μm or more.

In the present specification, the average particle diameter of silver oxide and the average particle diameters of respective particles described below (silver oxide, insulating inorganic particles, graphite, etc.) each mean a particle diameter ($D_{50}$) at a cumulative frequency of 50% in the volume-based distribution, measured by using a laser scattering particle size distribution analyzer (e.g., "LA-920" manufactured by HORIBA, Ltd.) in a state where these particles are dispersed in a medium that does not dissolve the particles.

When tellurium or a compound thereof is contained in the positive electrode mixture, the content of this additive is preferably adjusted such that the amount of tellurium(Te) element is 0.4 parts by mass or more, more preferably 1 part by mass or more, and particularly preferably 2 parts by mass or more with respect to 100 parts by mass of the total amount of silver (Ag) element in the silver oxide as the positive electrode active material, from the viewpoint of more favorably ensuring the above-described effects brought about by using the additive. However, if the amount of the additive in the positive electrode mixture is too large, the amount of the silver oxide as the active material is reduced, and this may result in reduced capacity and deteriorated load characteristics of the battery. Accordingly, the content of the additive in the positive electrode mixture is preferably adjusted such that the amount of tellurium (Te) element is 10 parts by mass or less, more preferably 5 parts by mass or less, and particularly preferably 4 parts by mass or less with respect to 100 parts by mass of the total amount of silver (Ag) element in the silver oxide.

Examples of the conductive assistant in the positive electrode mixture layer can include carbonaceous materials such as carbon black and graphite. As the conductive assistant, it is more preferable to use carbon black and graphite in combination.

Use of carbon black facilitates the formation of a favorable conductive network in the molded body of the positive electrode mixture or in the positive electrode mixture layer. Thus, for example, compared with the case where only graphite is used, the number of contact points with the silver oxide as the positive electrode active material can increase, thereby enabling a further reduction in the electric resistance in the molded body of the positive electrode mixture or in the positive electrode mixture layer. As a result, it becomes possible to further improve the reaction efficiency of the positive electrode active material.

On the other hand, in the case where only carbon black is used, it may be necessary to use a binder to improve the formability depending on the thickness of the molded body of the positive electrode mixture or the positive electrode mixture layer. However, when graphite is used in combination with carbon black, the formability of the positive electrode mixture is improved. Thus, for example, even when the molded body of the positive electrode mixture or the positive electrode mixture layer has a small thickness of 0.4 mm or less or more preferably 0.3 mm or less, the formability thereof is improved, thereby easily preventing the occurrence of defects in production without using a binder.

The graphite to be used in the positive electrode mixture may be either natural graphite (such as flake graphite) or artificial graphite. One of them may be used alone, or two or more of them may be used in combination.

As described above, graphite has a function of improving the formability of the molded body of the positive electrode mixture or the positive electrode mixture layer. From the viewpoint of allowing graphite to exhibit this function more favorably, the average particle diameter of the graphite is preferably 1 µm or more and more preferably 2 µm or more. Also, from the viewpoint of improving the conductivity, the average particle diameter of the graphite is preferably 7 µm or less and more preferably 5 µm or less.

Examples of carbon black to be used in the positive electrode mixture can include furnace black, channel black, acetylene black, and thermal black. One of them may be used alone, or two or more of them may be used in combination. Of these carbon blacks, it is preferable to use acetylene black, as it is highly conductive and contains few impurities.

It is preferable that the positive electrode mixture further contains insulating inorganic particles. In particular, when the alkaline battery is a secondary battery, this can further improve the charge-discharge cycle characteristics of the battery. When the positive electrode mixture further contains carbon black and graphite in addition to the insulating inorganic particles, still further improvement in charge-discharge cycle characteristics can be achieved when the alkaline battery is a secondary battery.

Examples of the insulating inorganic particles to be used in the positive electrode mixture can include particles of oxides of at least one element selected from Si, Zr, Ti, Al, Mg, and Ca. Specific examples of the oxides can include $Al_2O_3$, $TiO_2$, $SiO_2$, $ZrO_2$, MgO, CaO, AlOOH, and $Al(OH)_3$. It is preferable to use particles that are insoluble or poorly soluble in the alkaline electrolyte solution. One of these insulating inorganic particles may be used alone, or two or more of them may be used in combination.

If the particle diameter of the insulating inorganic particles is too large, the effect of improving the charge-discharge cycle characteristics may be reduced when, for example, the alkaline battery is a secondary battery. Accordingly the average particle diameter of the insulating inorganic particles is preferably 0.5 µm or less and more preferably 0.3 µm or less.

If the particle diameter of the insulating inorganic particles is too small, the charging efficiency (initial capacity) may be reduced when, for example, the alkaline battery is a secondary battery. Accordingly, the average particle diameter of the insulating inorganic particles is preferably 0.01 µm or more and more preferably 0.05 µm or more.

In order to secure the capacity, the composition of the positive electrode mixture is such that, for example, the content of the silver oxide as the positive electrode active material is preferably 60 mass % or more, more preferably 80 mass % or more, and particularly preferably 90 mass % or more.

The content of the conductive assistant in the positive electrode mixture is preferably 0.2 mass % or more, more preferably 0.5 mass % or more, and particularly preferably 1 mass % or more from the viewpoint of the conductivity. On the other hand, in order to prevent the reduction in capacity and the generation of gas during charging (in the case of a secondary battery), the content of the conductive assistant is preferably 8 mass % or less, more preferably 7 mass % or less, still more preferably 5 mass % or less, and particularly preferably 3 mass % or less.

When carbon black and graphite are contained in the positive electrode mixture, the content of the graphite is preferably 1 mass % or more and more preferably 2 mass % or more from the viewpoint of favorably ensuring the above-described effects brought about by using the graphite in combination with the carbon black. Also, the content of the graphite when the carbon black and the graphite are contained in the positive electrode mixture is preferably 7 mass % or less and more preferably 4 mass % or less from the viewpoint of, for example, preventing the capacity of the battery from being reduced owing to an excessively small amount of the silver oxide in the positive electrode mixture.

When carbon black and graphite are contained in the positive electrode mixture, the content of the carbon black is preferably 0.1 mass % or more and more preferably 0.5 mass % or more from the viewpoint of favorably ensuring the above-described effects brought about by using the carbon black in combination with the graphite. However, if the amount of the carbon black in the positive electrode mixture is too large, considerable swelling of the positive electrode may occur when the battery is stored under a high temperature condition, for example. Accordingly, from the viewpoint of suppressing swelling of the positive electrode during storage of the battery (in particular, storage at a high temperature of around 60° C.) in order to improve the storage characteristics of the battery, the content of the carbon black in the positive electrode mixture when the carbon black and the graphite are contained in the positive electrode mixture is preferably 1.5 mass % or less and more preferably 1 mass % or less.

When insulating inorganic particles are contained in the positive electrode mixture, the content thereof is preferably 0.1 mass % or more and more preferably 3 mass % or more from the viewpoint of favorably ensuring the effects brought about by using the insulating inorganic particles (in particular, the effect of improving the charge-discharge cycle characteristics in the case of a secondary battery). However, if the amount of the insulating inorganic particles in the positive electrode mixture is too large, the filling amount of the positive electrode active material decreases, thereby reducing the capacity of the battery, and in addition, depending on the type of insulating inorganic particles, a sudden reduction in discharge capacity may occur as the number of charge-discharge cycles performed increases in the case of a secondary battery. Accordingly the content of the insulating inorganic particles in the positive electrode mixture is preferably 7 mass % or less and more preferably 5 mass % or less.

As described above, the molded body of the positive electrode mixture or the positive electrode mixture layer can be formed without using a binder. However, a binder may be used when it is necessary to increase the strength (e.g., when graphite is not used as a conductive assistant). Examples of a binder to be used in the positive electrode mixture can include fluororesins such as polytetrafluoroethylene (PTFE). When a binder is used, the content of the binder in the positive electrode mixture is preferably 0.1 to 20 mas %.

When the positive electrode is a molded body of a positive electrode mixture, the positive electrode can be produced by, for example, mixing silver oxide as a positive electrode active material, tellurium or a compound thereof, a conductive assistant, and when necessary, an alkaline electrolyte solution (which may be the same as an alkaline electrolyte solution injected into the battery) to prepare a positive electrode mixture and then pressure-molding the positive electrode mixture into a predetermined shape.

When the positive electrode is formed of a positive electrode mixture layer and a current collector, the positive electrode can be produced by, for example, dispersing silver oxide as a positive electrode active material, tellurium or a compound thereof, a conductive assistant, and the like in water or an organic solvent such as N-methyl-2-pyrrolidone (NMP) to prepare a positive electrode mixture-containing composition (slurry, paste, or the like), applying the composition to the current collector, then drying the composition, and when necessary, subjecting the current collector with the composition to pressing such as calendering.

It is to be noted, however, that the positive electrode is not limited to those produced by the above-described methods, and may be produced by other methods.

When the positive electrode is a molded body of a positive electrode mixture, the thickness thereof is preferably 0.15 to 4 mm. On the other hand, when the positive electrode is formed of a positive electrode mixture layer and a current collector, the thickness of the positive electrode mixture layer (the thickness thereof per one surface of the current collector) is preferably 30 to 300 μm.

When a current collector is used for the positive electrode, the current collector may be made of, for example, a stainless steel such as SUS316, SUS430, or SUS444, aluminum, or an aluminum alloy. The current collector may be in the form of, for example, a plain-woven wire mesh, an expanded metal, a lath mesh, a perforated metal sheet, a metal foam, or a foil (plate). The thickness of the current collector is preferably 0.05 to 0.2 mm, for example. It is also desirable to apply a conductive material in the form of a paste, such as a carbon paste or as silver paste, to a surface of the current collector.

Alkaline Battery

The alkaline battery of the present invention includes, as power generation components, a positive electrode containing silver oxide as a positive electrode active material, a negative electrode, a separator, and an alkaline electrolyte solution. The alkaline battery of the present invention encompasses a primary battery and a secondary battery.

As the above-described positive electrode, the positive electrode for alkaline batteries according to the present invention can be used.

The negative electrode of the alkaline battery uses, as an active material, zinc particles, i.e., particles made of pure zinc (containing unavoidable impurities) or a zinc alloy, or a zinc foil, for example. Examples of an alloy component in zinc alloy particles include indium, bismuth, and aluminum (the remainder is composed of zinc and unavoidable impurities). The zinc particles contained in the negative electrode may consist of one type of particles with a single composition, or may contain two or more types of particles with different compositions.

It should be noted that it is preferable to use zinc particles that do not contain mercury as an alloy component. Use of such zinc particles in batteries can reduce environmental pollution caused when discarding the batteries. Also, it is preferable to use zinc particles that do not contain lead as an alloy component for the same reason as described for mercury.

The particle size of zinc particles may be as follows, for example: the proportion of particles with a particle diameter of 75 μm or less in all particles is preferably 50 mass % or less and more preferably 30 mass % or less; or the proportion of particles with a particle diameter of 100 μm to 200 μm in all particles is preferably 50 mass % or mare and more preferably 90 mass % or more. The "particle size" of zinc particles as used here is a value obtained by the same measurement method as the above-described method for measuring the average particle diameter of silver oxide.

In addition to the above-described zinc particles, the negative electrode may further contain, for example, a gelling agent (such as sodium polyacrylate or carboxymethyl cellulose) when necessary. This may be mixed with an alkaline electrolyte solution to form a negative electrode agent (gel-like negative electrode). The amount of the gelling agent in the negative electrode is preferably 0.5 to 1.5 mass %, for example.

The negative electrode may be a non-gel negative electrode that is substantially free of the above-described gelling agent (Anon-gel negative electrode may contain a gelling agent as long as the viscosity of an alkaline electrolyte solution present in the vicinity of zinc particles does not increase. Thus, the phrase "substantially free of a gelling agent" means that the gelling agent may be contained to the extent that it does not affect the viscosity of the alkaline electrolyte solution.). In the case of a gel-like negative electrode, an alkaline electrolyte solution is present together with a gelling agent in the vicinity of zinc particles. However, the viscosity of the alkaline electrolyte solution increases owing to the action of the gelling agent. This hinders the movement of the alkaline electrolyte solution, which, in turn, hinders the movement of ions in the electrolyte. It is considered that this reduces the reaction rate in the negative electrode, thereby hindering the improvement in load characteristics (in particular, heavy load characteristics) of the battery. To address this problem, by using a non-gel negative electrode, an increase in the viscosity of an alkaline electrolyte solution present in the vicinity of zinc particles is not caused and the moving speed of ions in the alkaline electrolyte solution can be kept high. As a result, the reaction rate in the negative electrode can be increased, whereby the load characteristics (in particular, heavy load characteristics) can be further improved.

The alkaline electrolyte solution contained in the negative electrode may be the same as an alkaline electrolyte solution to be injected into the battery.

The content of the zinc particles in the negative electrode is, for example, preferably 60 mass % or more and more preferably 65 mass % or more, and also, preferably 75 mass % or less and more preferably 70 mass % or less.

The negative electrode preferably contains an indium compound. When the negative electrode contains an indium compound, the generation of gas due to a corrosion reaction between the zinc particles and the alkaline electrolyte can be prevented more effectively.

The above-described indium compound may be, for example, indium oxide or indium hydroxide.

The amount of the indium compound used in the negative electrode is preferably 0.003 to 1 with respect to 100 of the zinc particles in terms of mass ratio.

When tellurium or a compound thereof is contained in the negative electrode, the content thereof is preferably adjusted such that the amount of tellurium (Te) element is 0.4 parts by mass or more, more preferably 1 part by mass or more, and particularly preferably 2 parts by mass or more with respect to 100 parts by mass of the total amount of silver (Ag) element in the silver oxide as the positive electrode active material, from the viewpoint of more favorably ensuring the above-described effects brought about by using it. However, if the amount of this additive in the negative electrode is too large, the amount of zinc particles or a zinc foil as the negative electrode active material is reduced, which may result in reduced capacity and deteriorated load characteristics of the battery. Accordingly, the content of the additive in the negative electrode is preferably adjusted such that the amount of tellurium(Te) element is 10 parts by mass or less, more preferably 5 parts by mass or less, and particularly preferably 4 parts by mass or less with respect to 100 parts by mass of the total amount of silver (Ag) element in the silver oxide.

A suitable alkaline electrolyte solution to be used in the alkaline battery is an aqueous solution containing one or more alkali metal hydroxides (such as sodium hydroxide, potassium hydroxide, and lithium hydroxide). Of these metal hydroxides, potassium hydroxide is particularly preferable. When the alkaline electrolyte solution is, for example, an aqueous solution of potassium hydroxide, the concentration of the alkaline electrolyte solution is such that the amount of the potassium hydroxide is preferably 20 mass % or more and more preferably 30 mass % or more and is preferably 40 mass % or less and more preferably 38 mass % or less. By adjusting the concentration of the aqueous solution of the potassium hydroxide to such a value, it is possible to provide an alkaline electrolyte solution with excellent conductivity.

When tellurium or a compound thereof is dissolved in the alkaline electrolyte solution, the content of this additive is preferably adjusted such that the amount of tellurium (Te) element is 0.4 parts by mass or more with respect to 100 parts by mass of the total amount of silver (Ag) element in the silver oxide as the positive electrode active material. For example, in order to allow the above-described adjustment to be performed easily the content of the additive in the electrolyte solution is preferably adjusted such that the content of the tellurium (b) element is 0.1 mass % or more, more preferably 1 mass % or more, and particularly preferably 2 mass % or more. However, if the content of the additive in the alkaline electrolyte solution is too high, the viscosity of the electrolyte solution may increase to reduce the ionic conductance, whereby the load characteristics of the battery may be deteriorated. Accordingly, the content of the additive in the alkaline electrolyte solution is preferably adjusted such that the content of tellurium(Te) element is 10 mass % or less, more preferably 8 mass % or less, and particularly preferably 6 mass % or less.

In addition to the above-described components, various known additives may be added to the alkaline electrolyte solution when necessary to the extent that the effects of the present invention are not impaired. For example, zinc oxide may be added to prevent corrosion (oxidation) of the zinc particles used in the negative electrode of the alkaline battery. Note here that zinc oxide may be added to the negative electrode as well.

When the alkaline battery is a secondary battery, at least one selected from the group consisting of manganese compounds, tin compounds, and indium compounds may be dissolved in the alkaline electrolyte solution.

When an alkaline secondary battery that has a positive electrode containing silver oxide as a positive electrode active material is discharged, silver is generated from the silver oxide in the positive electrode. When this battery is charged, crystals of the silver oxide are formed around the silver. As a result, the reaction area of the positive electrode active material is substantially reduced, thereby inhibiting subsequent cell reactions. However, when these compounds are dissolved in the alkaline electrolyte solution, ions derived from these compounds (manganese ions, tin ions, and indium ions) adsorb onto the positive electrode. As a result, the growth of silver oxide crystals is inhibited, whereby the silver oxide crystals to be formed are made small. This can prevent the occurrence of the problem that the silver oxide crystals formed during charging of the battery inhibit cell reactions, and thus can further improve the charge-discharge cycle characteristics when, for example, the battery is a secondary battery.

Examples of the manganese compound to be dissolved in the alkaline electrolyte solution can include manganese chloride, manganese acetate, manganese sulfide, manganese sulfate, and manganese hydroxide. Examples of the tin compound to be dissolved in the alkaline electrolyte solution can include tin chloride, tin acetate, tin sulfide, tin bromide, tin oxide, tin hydroxide, and tin sulfate. Examples of the indium compound to be dissolved in the alkaline electrolyte solution can include indium hydroxide, indium oxide, indium sulfate, indium sulfide, indium nitrate, indium bromide, and indium chloride.

The concentration of the indium compound, manganese compound, and/or tin compound in the alkaline electrolyte solution (when only one of these compounds is dissolved, the concentration refers to the concentration of this compound, and when two or more f them are dissolved, the concentration refers to the total of the concentrations of these compounds) is, on a mass basis, 50 ppm or more and more preferably 500 ppm or more, and also preferably 10000 ppm or less and more preferably 5000 ppm or less, from the viewpoint of more favorably ensuring the above-described effects.

In the alkaline batter, a separator is interposed between the positive electrode and the negative electrode. Examples of the separator that can be used in the alkaline battery can include nonwoven fabrics mainly made of vinylon and rayon, vinylon-rayon nonwoven fabrics (vinylon-rayon mixed paper), polyamide nonwoven fabrics, polyolefin-rayon nonwoven fabrics, vinylon paper, vinylon-linter pulp paper, and vinylon-mercerized pulp paper. The separator may be a laminate of a microporous polyolefin film (such as a microporous polyethylene film or a microporous polypropylene film) that has been subjected to a hydrophilic treatment, a cellophane film, and a liquid absorbing laver (electrolyte solution retaining layer) such as vinylon-rayon mixed paper. The thickness of the separator is preferably 20 to 500 µm.

When the alkaline battery is a secondary battery, it is preferable to dispose, between the positive electrode and the negative electrode, an anion conductive membrane in which a polymer is used as a matrix and particles of at least one metal compound selected from the group consisting of metal oxides, metal hydroxides, metal carbonates, metal sulfates, metal phosphates, metal borates, and metal silicates are dispersed in the matrix. The anion conductive membrane also functions as a separator.

When tellurium or a compound thereof is contained in the separator, the content thereof is preferably adjusted such that the amount of tellurium Ge) element is 0.4 parts by mass or more, more preferably 1 part by mass or more, and particularly preferably 2 parts by mass or more with respect to 100 parts by mass of the total amount of silver (Ag) element in the silver oxide as the positive electrode active material, from the viewpoint of more favorably ensuring the above-described effects brought about by using it. However, if the amount of this additive in the separator is too large, permeation of ions in the electrolyte solution may be inhibited, thereby deteriorating the load characteristics of the battery. Accordingly, the content of the additive in the separator is preferably adjusted such that the amount of tellurium (Te) element is 10 parts by mass or less, more preferably 5 parts by mass or less, and particularly preferably 4 parts by mass or less with respect to 100 parts by mass of the total amount of silver (Ag) element in the silver oxide.

Furthermore, in the alkaline battery, an additive selected from polyalkylene glycols and calcium compounds is preferably contained in at least one of the negative electrode, the alkaline electrolyte solution, and the separator In this case, polyalkylene glycols and calcium compounds can inhibit the growth of zinc dendrites in the negative electrode, thereby enabling a further improvement in the charge-discharge cycle characteristics of the alkaline battery (when the alkaline battery is a secondary battery) and in the storage characteristics of the alkaline battery.

The polyalkylene glycols are compounds in which alkylene glycols such as ethylene glycol, propylene glycol, and butylene glycol are polymerized or copolymerized. The compounds may have a cross-linked structure, a branched structure, or a structure having a substituted end. As the polyalkylene glycols, compounds with a weight-average molecular weight of approximately 200 or more are preferably used. Although the upper limit of the weight-average molecular weight is not restricted, the compounds are preferably water-soluble in order to obtain the effects of adding the compounds more easily. Typically, those having a weight-average molecular weight of 20000 or less are preferably used, and those having a weight-average molecular weight of 5000 or less are more preferably used.

More specifically, polyethylene glycols in which ethylene glycol is polymerized (such as polyethylene glycol and polyethylene oxide) and polypropylene glycols in which propylene glycol is polymerized (such as polypropylene glycol and polypropylene oxide) are preferably used, and in addition to these compounds, copolymer compounds including an ethylene oxide unit and a propylene oxide unit (such as polyoxyethylene polyoxypropylene glycol) also may be used.

When a polyalkylene glycol is used, it is preferable that 0.01 to 1.5 parts by mass of the polyalkylene glycol is present with respect to 100 parts by mass of zinc particles.

The calcium compound may be a compound that reacts with $Zn(OH)_4^{2-}$, which is generated during discharge, to produce a complex compound such as $CaZn(OH)_4$ (examples of the compound include calcium hydroxide, calcium oxide, calcium chloride, and calcium sulfate) or the complex compound itself. Of these compounds, calcium hydroxide and calcium oxide can be used preferably.

When a calcium compound is used, the amount thereof preferably is such that to 40 parts by mass of the calcium compound is present with respect to 100 parts by mass of zinc particles.

When tellurium or a compound thereof is contained in two or more of the power generation components, the amount thereof may be adjusted in such a way that the total of the contents of tellurium element retained in the respective power generation components falls within the above-described range. Further, when a component other than the power generation components, such as, for example, an electrolyte solution absorber to be described below, is housed in the battery together with the power generation components, the total content of tellurium element retained in the components housed in the battery (including the power generation components) falls within the above-described range.

Figure 1:
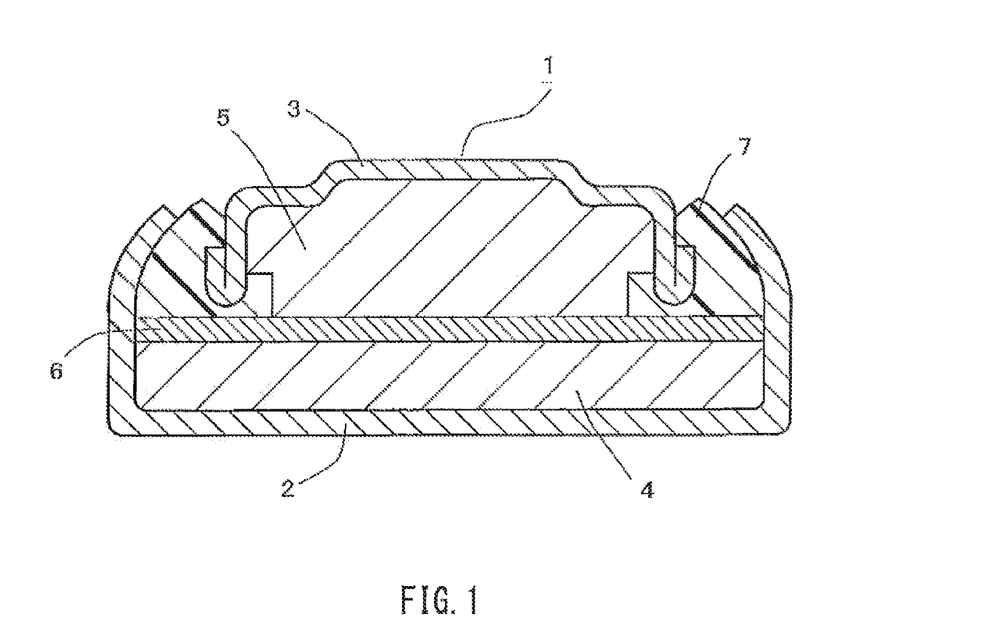
FIG. 1 is a cross-sectional view schematically showing an example of the alkaline battery of the present invention.

FIG. 1 is a vertical cross-sectional view schematically showing an example of the alkaline battery of the present invention. FIG. 1 shows an alkaline battery 1, which is an example where the present invention is applied to a flat-type battery. In the alkaline battery 1, a sealing plate 3 provided with a negative electrode 5 is fitted into the opening of an outer can 2 in which a positive electrode 4 and a separator 6 are placed, with an annular gasket 7 having an L-shaped cross section interposed between the sealing plate 3 and the outer can 2. As a result, the edge of the opening of the outer can 2 is tightened inward to bring the gasket 7 into contact with the sealing plate 3, whereby the opening of the outer can 2 is sealed to provide a sealed structure inside the battery. That is, the alkaline battery 1 shown in FIG. 1 is configured such that power generation components including the positive electrode 4, the negative electrode 5, and the separator 6 are placed in a space (closed space) of a battery container that is constituted by the outer can 2, the sealing plate 3, and the gasket 7, and in addition, an alkaline electrolyte solution (not shown) is contained in the space. The outer can 2 also serves as a positive electrode terminal, and the sealing plate 3 also serves as a negative electrode terminal.

Moreover, in the alkaline battery 1 shown in FIG. 1, the peripheral edge portion of the positive electrode 4 is placed between the inner bottom surface of the outer can 2 and the bottom surface of the gasket 7.

Figure 2:
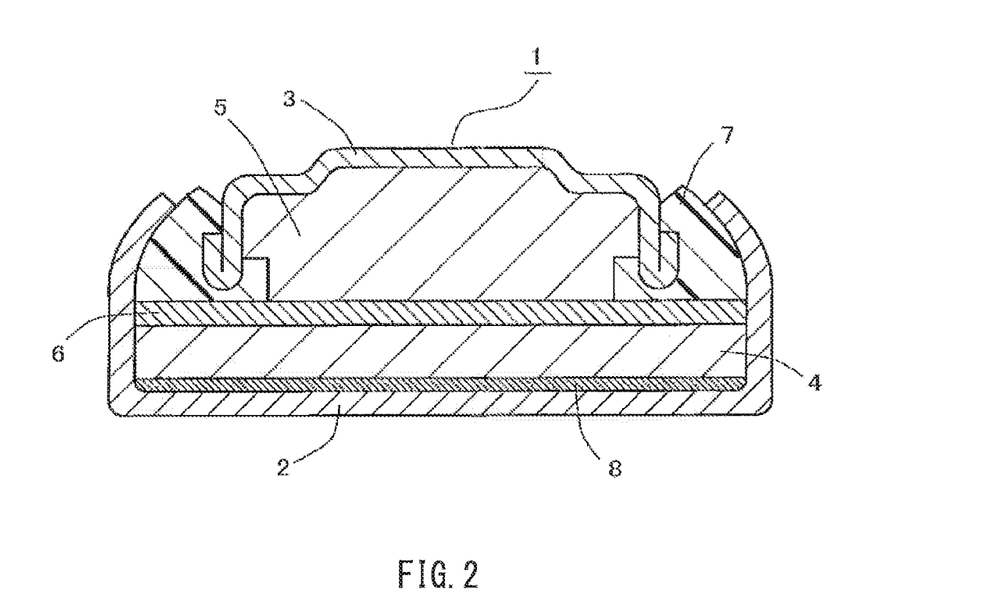
FIG. 2 is a cross-sectional view schematically showing another example of the alkaline battery of the present invention.

FIG. 2 is a vertical cross-sectional view schematically showing another example of the alkaline battery of the present invention. An alkaline battery 1 shown in FIG. 2 is an example where a porous electrolyte solution absorber 8 is placed between a positive electrode 4 and the inner bottom surface of an outer can 2. In a flat-type alkaline battery including an outer can and a sealing plate as shown in FIG. 2, when the amount of an electrolyte solution is large, a porous electrolyte solution absorber may be inserted between a positive electrode and the inner bottom surface of the outer can in order to prevent the leakage of the electrolyte solution during the assembly of the battery.

More specifically, since it takes some time for the separator and the positive electrode to absorb an electrolyte solution after the electrolyte solution is injected into the outer can, leakage of the electrolyte solution is likely to occur at the time of sealing when the amount of the electrolyte solution is large. However, by placing the electrolyte solution absorber on the inner bottom surface of the outer can before placing the positive electrode in the outer can in the assembly of the battery, the electrolyte solution absorber absorbs and retains a certain amount of electrolyte solution after the electrolyte solution is injected into the outer can. This can suppress the leakage of the electrolyte solution.

The electrolyte solution absorber may be a porous sheet or the like. Examples of the electrolyte solution absorber include: porous sheets made of resin (also including porous sheets made of paper), such as nonwoven fabrics mainly made of vinylon and rayon, vinylon-rayon nonwoven fabrics (vinylon-rayon mixed paper), polyamide nonwoven fabrics, polyolefin-rayon nonwoven fabrics, vinylon paper, vinylon-linter pulp paper, and vinylon-mercerized pulp paper; and porous carbon sheets made of fibrous carbon (such as carbon paper, carbon cloth, and carbon felt).

The porosity of the electrolyte solution absorber is preferably 40% or more and more preferably 60% or more, because this enhances its function of favorably absorbing and retaining the electrolyte solution. However, if the porosity of the electrolyte solution absorber is too high, the function of retaining the electrolyte solution may be deteriorated. Accordingly, the porosity of the electrolyte solution absorber is preferably 90% or less and more preferably 80% or less.

Further, from the viewpoint of allowing the electrolyte solution absorber to absorb the electrolyte solution quickly, the average pore diameter of the electrolyte solution absorber is preferably 5 µm or more and more preferably 20 µm or more. However, if the pore diameter of the electrolyte solution absorber is too large, the function of retaining the electrolyte solution may be deteriorated. Accordingly, the average pore diameter of the electrolyte solution absorber is preferably 100 µm or less and more preferably 50 µm or less. In the present specification, the average pore diameter of the electrolyte solution absorber refers to a value measured according to a bubble point method specified in JIS K 3832.

Moreover, from the viewpoint of allowing the electrolyte solution absorber to retain a somewhat large amount of electrolyte solution, the thickness of the electrolyte solution absorber is preferably 30 µm or more and more preferably 50 µm or more. However, if the electrolyte solution absorber is too thick, it becomes necessary to reduce the amount of the positive electrode and the amount of the negative electrode in the battery, and this may cause reduction in capacity. Accordingly, the thickness of the electrolyte solution absorber is preferably 150 µm or less and more preferably 100 µm or less.

When the flat-type battery employs an electrolyte solution absorber made f, for example, a conductive material such as a carbon sheet, the positive electrode and the outer can are electrically connected to each other via the electrolyte solution absorber, and thus, the use of the electrolyte solution absorber does not impair current collection from the positive electrode. However, when the flat-type battery employs an insulating electrolyte solution absorber such a resin sheet, a contact portion between the positive electrode and the inner bottom surface of the outer can is small, and thus, current collection from the positive electrode may be insufficient. Accordingly, in the flat-type battery, it is preferable that the positive electrode and the side wall of the outer can are electrically connected to each other. This allows current collection from the positive electrode to be well performed even in the case where an insulating electrolyte solution absorber is used.

Electrical connection between the positive electrode and the side wall of the outer can may be achieved, for example, through direct contact of the side surface of the positive electrode with the side wall of the outer can as shown in FIG. 2, or alternatively, by holding the positive electrode on a metal base and bringing this metal base into contact with the side wall of the outer can.

The alkaline battery of the present invention is not limited to a flat-type battery as shown in FIG. 1, and may be, for example, a tubular-type battery (including a cylindrical battery and a rectangular (rectangular tubular) battery) with a battery case constituted by joining a bottomed tubular outer can and a sealing plate by caulking via a gasket or by welding an outer can and a sealing plate to seal the joint between them.

For the outer can of the alkaline battery nickel-plated iron, stainless steel, or the like can be used, for example.

For the sealing plate of the alkaline battery, nickel-plated iron, stainless steel, or the like can be used, for example. When the zinc particles as the negative electrode active material are in direct contact with the inner surface of the sealing plate, it is preferable to form a metal layer made of copper or a copper alloy such as brass on a surface of the sealing plate on the side to be in contact with the negative electrode. Furthermore, it is more preferable to form a tin layer on the surface of the metal layer. The reason for forming the metal layer made of copper or a copper alloy on the surface of the sealing plate on the side to be in contact with the negative electrode is to prevent corrosion of zin by inhibiting the formation of a local cell with zinc. By further forming a tin layer on the surface of the metal layer, the above-described effect of preventing corrosion can be further enhanced.

The gasket of the alkaline battery may be made of a material such as nylon or polypropylene.

When the alkaline battery is a flat-type alkaline battery, the shape of the battery as viewed in a plan view may be a circular shape or a polygonal shape such as a quadrangular (square or rectangular) shape. When the battery has a polygonal shape, it may have curved corners.

EXAMPLES

In the following, the present invention will be described in detail with reference to examples. It is to be noted, however, that the following examples do not limit the present invention by any means.

Example 1

88 parts by mass of silver(I)oxide ($Ag_2O$) having an average particle diameter of 1.4 µm and containing 3.7% (on a mass basis) of Bi with respect to the total amount of silver, 3.8 parts by mass of graphite particles (BET specific surface area: 20 $m^2/g$, average particle diameter: 3.7 µm), 1.2 parts by mass of carbon black (acetylene black, BET specific surface area: 68 $m^2/g$; average particle diameter of primary particles: 35 nm), 1 part by mass of $TiO_2$ particles (average particle diameter: 250 nm), 3 parts by mass of tellurium dioxide, and 3 parts by mass of polytetrafluoroethylene (PTFE) were mixed together to prepare a positive electrode mixture.

73 mg of this positive electrode mixture was packed into a mold at a packing density of 5.7 $g/cm^3$ and pressure-molded into a disk shape with a diameter of 5.2 mm and a height of 0.6 mm. Thus, a positive electrode mixture molded body was produced. In the positive electrode mixture used to constitute the above-described positive electrode mixture molded body, the amount of tellurium element with respect to 100 parts by mass of Ag in the silver oxide was 3.0 parts by mass. The positive electrode mixture did not contain cadmium. Thus, a positive electrode constituted by the positive electrode mixture molded body and substantially free of cadmium was obtained.

As a negative electrode active material, mercury-free zinc alloy particles that had been widely used in alkaline primary batteries and contained In (500 ppm), Bi (400 ppm), and Al(10 ppm) as additive elements were used. The particle size of the zinc alloy particles was determined by the above-described method. As a result, it was found that the average particle diameter ($D_{50}$) was 120 μm and the proportion of the particles with a particle diameter of 75 μm or less was 25 mass % or less.

The above-described zinc alloy particles and ZnO were mixed together at a ratio (mass ratio) of 97:3. Thus, a composition for forming a negative electrode (negative electrode composition) was obtained. 18 mg of this composition was weighed out and used to prepare the negative electrode.

An aqueous solution obtained by dissolving potassium hydroxide at a concentration of 35 mass % and then further dissolving zinc oxide at a concentration of 3 mass % was used as the alkaline electrolyte solution.

5 g of an aqueous dispersion of PTFE (solid content: 60 mass %), 2.5 g of an aqueous solution of sodium polyacrylate (concentration: 2 mass %), and 2.5 g of hydrotalcite particles (average particle diameter: 0.4 μm) were kneaded together and then subjected to rolling to form a membrane with a thickness of 100 μm. Then, a circular piece with a diameter of 5.6 mm was punched out of the membrane. Thus, an anion conductive membrane was produced.

Two graft films (thickness: 30 μm) each composed of a graft copolymer obtained through graft copolymerization of acrylic acid with a polyethylene main chain were disposed on both sides of a cellophane film (thickness: 20 μm) to form a multilayer film, and vinylon-rayon mixed paper (thickness: 100 μm) was laminated on this multilayer film. A circular piece with a diameter of 5.6 mm was punched out of the thus-obtained laminate, and the above-described anion conductive membrane was further laminated thereon, thereby obtaining a separator.

The above-described positive electrode (positive electrode mixture molded body), negative electrode (negative electrode composition), alkaline electrolyte solution, and separator were sealed in a battery container constituted by an outer can made of a steel plate and having a gold-plated inner surface, a sealing plate that was a copper-stainless steel (SUS304)-nickel clad plate, and an annular gasket made of nylon 66. Thus, an alkaline secondary battery with a structure shown in FIG. 1 and having a diameter of 5.8 mm and a thickness of 2.7 mm was produced. In the assembly of the battery, part of the alkaline electrolyte solution was added dropwise into the outer can before placing the positive electrode in the outer can, and the remainder was pre-mixed with the negative electrode composition. The separator was disposed with the anion conductive membrane facing the negative electrode.

Example 2

An alkaline secondary battery was prepared in the same manner as in Example 1, except that 90.5 parts by mass of the silver(I) oxide ($Ag_2O$), 3.8 parts by mass of graphite particles, 1.2 parts by mass of carbon black, 1 part by mass of $TiO_2$ particles, 0.5 parts by mass of tellurium dioxide, and 3 parts by mass of polytetrafluoroethylene (PTFE) were mixed together to prepare a positive electrode mixture. In the positive electrode mixture used to constitute the above-described positive electrode mixture molded body, the amount of tellurium element with respect to 100 parts by mass of Ag in the silver(I) oxide was 0.5 parts by mass.

Example 3

An alkaline secondary battery was prepared in the same manner as in Example 1, except that 89.5 parts by mass of the silver(I) oxide ($Ag_2O$), 3.8 parts by mas of graphite particles, 1.2 parts by mass of carbon black, 1 part by mass of $TiO_2$ particles, 1.5 parts by mass of tellurium dioxide, and 3 parts by mass of polytetrafluoroethylene (PTFE) were mixed together to prepare a positive electrode mixture. In the positive electrode mixture used to constitute the above-described positive electrode mixture molded body, the amount of tellurium element with respect to 100 parts by mass of Ag in the silver(I) oxide was 1.5 parts by mass.

Comparative Example 1

An alkaline secondary battery was prepared in the same manner as in Example 1, except that 91 parts by mass of the silver(I) oxide ($Ag_2O$), 3.8 parts by mass of graphite particles, 1.2 parts by mass of carbon black, 1 part by mass of $TiO_2$ particles, and 3 parts by mass of polytetrafluoroethylene (PTFE) were mixed together to prepare a positive electrode mixture.

Measurement of Internal Resistance of Battery

Five batteries were prepared for each of Examples 1 to 3 and Comparative Example 1, and the internal resistances of these batteries at 20° C. were measured according to an alternating current impedance method at a frequency of 1 kHz. The average value of the measured values was determined as the internal resistance of the batteries.

Evaluation of Charge-Discharge Cycle Characteristics

Five batteries were prepared for each of Examples 1 to 3 and Comparative Example 1. Each battery was subjected to repeated charge-discharge cycles with each charge-discharge cycle consisting of constant current discharge in which the battery was discharged with a constant current of 2.1 mA until the voltage reached 1.2 V and constant current-constant voltage charge in which the battery was first charged with a constant current of 2.1 mA until the voltage reached 1.8V and subsequently charged with a constant voltage of 1.8V until the current value reached 0.21 mA. As the discharge capacity of each battery in each cycle, the average value of the measured values for the five batteries was determined. The charge-discharge cycle characteristics were evaluated on the basis of the ratio of the discharge capacity in the 100th cycle to the discharge capacity in the 10th cycle (i.e., the capacity retention).

The results obtained are both shown in Table 1.

TABLE 1

|  | Internal Resistance (mΩ) | Capacity Retention (%) |
| --- | --- | --- |
| Example 1 | 19.1 | 92.2 |
| Example 2 | 22.7 | 94.2 |
| Example 3 | 20.8 | 95.4 |

TABLE 1-continued

|  | Internal Resistance (mΩ) | Capacity Retention (%) |
|---|---|---|
| Comparative Example 1 | 24.1 | 71.4 |

As shown in Table 1, the alkali secondary batteries of Examples 1 to 3 each including the positive electrode containing silver(I) oxide and tellurium dioxide (compound of tellurium) exhibited a lower internal resistance, and in addition, exhibited higher capacity retention in the evaluation of charge-discharge cycle characteristics and thus had more excellent charge-discharge cycle characteristics, compared to the battery of Comparative Example 1 including the positive electrode not containing a compound of tellurium.

Example 4

90.3 parts by mass of silver(I) oxide ($Ag_2O$) having an average particle diameter of 1.4 μm and containing 3.7% (on a mass basis) of Bi with respect to the total amount of silver, 3.8 parts by mass of graphite particles (BET specific surface area: 20 $m^2/g$, average particle diameter: 3.7 μm), 1.9 parts by mass of carbon black (acetylene black, BET specific surface area: 68 $m^2/g$, average particle diameter of primary particles: 35 nm), 1 part by mass of $TiO_2$ particles (average particle diameter: 250 nm), and 3 parts by mass of polytetrafluoroethylene (PTFE) were mixed together to prepare a positive electrode mixture substantially free of cadmium. Then, a positive electrode constituted by a positive electrode mixture molded body was produced in the same manner as in Example 1, except that this positive electrode mixture was used.

An aqueous solution was prepared by dissolving potassium hydroxide at a concentration of 35 mass % and then dissolving zinc oxide at a concentration of 3 mass %. Then, in this aqueous solution, lithium hydroxide at a concentration of 1 mass %, polyethylene glycol at a concentration of 1 mass %, and tellurium dioxide at a concentration of 9.2 mass % to prepare a mixed solution as an alkaline electrolyte solution. The tellurium element content in the above-described electrolyte solution was 7.4 mass %.

An alkaline secondary battery was produced in the same manner as in Example 1, except that the above-described positive electrode (positive electrode mixture molded body) and the above-described alkaline electrolyte solution were used. The total content of tellurium element in power generation components of this alkaline secondary battery was 3.1 parts by mass with respect to 100 parts by mass of the total amount of silver element in the positive electrode active material.

Example 5

An alkaline electrolyte solution was prepared in the same manner as in Example 4, except that sodium hydroxide was used instead of the potassium hydroxide. An alkaline secondary battery was produced in the same manner as in Example 4, except that the thus-prepared alkaline electrolyte solution was used.

Comparative Example 2

An aqueous solution was prepared by dissolving potassium hydroxide at a concentration of 35 mass % and then dissolving zinc oxide at a concentration of 3 mass %. Then, a mixed solution was prepared by further dissolving, in this aqueous solution, lithium hydroxide at a concentration of 1 mass % and polyethylene glycol at a concentration of 1 mass %. An alkaline secondary battery was produced in the same manner as Example 4, except that the thus-prepared mixed solution (aqueous solution not containing tellurium) was used as an alkaline electrolyte solution.

Comparative Example 3

An alkaline electrolyte solution was prepared in the same manner as in Comparative Example 2, except that sodium hydroxide was used instead of the potassium hydroxide. An alkaline secondary battery was produced in the same manner as in Comparative Example 1, except that the thus-prepared alkaline electrolyte solution was used.

Example 6

A positive electrode mixture was prepared in the same manner as in Example 4, except that 87.3 parts by mass of silver(I) oxide and 3 parts by mass of tellurium dioxide were used instead of 90.3 parts by mass of the silver)oxide. Further, an alkaline secondary battery was produced in the same manner as in Comparative Example Z, except that the above-described positive electrode mixture was used.

In the above-described positive electrode mixture, the amount of tellurium element with respect to 100 parts by mass of Ag in the silver(I)oxide was 3.1 parts by mass.

Example 7

An alkaline secondary battery was produced in the same manner as in Example 6, except that the same alkaline electrolyte solution as in Comparative Example 3 was used.

Five batteries were prepared for each of Examples 4 to 7 and Comparative Examples 2 and 3, and the internal resistance of the batteries was determined in the same manner as for the batteries of Example 1 etc.

Five batteries were prepared for each of Examples 4 to 7 and Comparative Examples 2 and 3. Each battery was subjected to repeated charge-discharge cycles under the same conditions as for the batteries of Example 1 etc. The discharge capacities of the respective batteries in the 150th cycle were measured, and the charge-discharge cycle characteristics was evaluated on the basis of the average value of the measured values.

The results obtained are both shown in Table 2.

TABLE 2

|  | Internal Resistance (mΩ) | Charge-Discharge Cycle Characteristics Discharge Capacity (mAh) |
|---|---|---|
| Example 4 | 25.2 | 9.6 |
| Example 5 | 40.8 | 8.9 |
| Example 6 | 17.2 | 8.7 |
| Example 7 | 32.9 | 9.2 |
| Comparative Example 2 | 19.3 | 7.1 |
| Comparative Example 3 | 35.4 | 6.4 |

It was found that the alkaline secondary batteries of Examples 4 to 7 each maintained a high discharge capacity even after the completion of 150 cycles and thus had more excellent charge-discharge cycle characteristics compared with the batteries of Comparative Examples 2 and 3 containing the alkaline electrolyte solution not containing a compound of tellurium.

Moreover, in the alkaline secondary batteries of Examples 6 and 7 in which tellurium dioxide was contained in the positive electrode, this additive acted efficiently in the positive electrode, whereby these batteries could exhibit a reduced internal resistance compared with the batteries of Comparative Examples 2 and 3.

Example 8

25.8 mg of the alkaline electrolyte solution prepared in Example 4 was used as an electrolyte solution to be contained in a battery container. An electrolyte solution absorber (porosity: 65%, average pore diameter: 20 μm, thickness: 100 μm) made of a vinylon-rayon nonwoven fabric and having a circular shape with a diameter of 5.5 mm was placed on the inner bottom surface of an outer can made of a steel plate and having a gold-plated inner surface. 9 μL of the above-described alkaline electrolyte solution was added dropwise to the electrolyte solution absorber, and thereafter, the positive electrode (positive electrode mixture molded body) prepared in Example 4 was placed in the outer can. The remainder of the alkaline electrolyte solution was pre-mixed with a negative electrode composition and housed together with the negative electrode composition in a sealing plate that was a copper-stainless steel (SUS304)-nickel clad plate and fitted with an annular gasket made of nylon 66. Thereafter, an alkaline secondary battery with the same structure as that shown in FIG. 2 and having a diameter of 5.8 mm and a thickness of 2.7 mm was assembled in the same manner as in Example 1.

Example 9

An alkaline secondary battery was produced in the same manner as in Example 8, except that the electrolyte solution absorber was not used.

The following evaluations were made on the alkaline secondary batteries of Examples 8 and 9.

Evaluation of Presence or Absence of Leakage During Production

Twenty alkaline secondary batteries of each of Examples 8 and 9 were assembled, and the number of batteries that caused leakage was determined.

Evaluation of Discharge Characteristics

The discharge capacity of a battery of each of Examples 8 and 9 was measured by discharging the battery at a current value of 1.0 mA until the voltage reached 1.0 V. As the battery of Example 9, the one that did not cause leakage during the assembly was used.

Table 3 shows the results of the respective evaluations.

TABLE 3

|  | Number of Batteries that Caused Leakage During Assembly (out of 20 batteries) | Discharge Capacity (mAh) |
| --- | --- | --- |
| Example 8 | 0 | 9.5 |
| Example 9 | 15 | 9.4 |

As shown in Table 3, some of the alkaline secondary batteries of Example 9 including no electrolyte solution absorber caused leakage during the assembly. In contrast, in the flat-type alkaline secondary batteries of Example 8, the occurrence of leakage during the assembly was not observed owing to the function of the electrolyte solution absorber, and it was found that these batteries thus had good productivity.

In the battery of Example 8, the electrolyte solution absorber was made of an insulating material. However, since the battery of Example 8 was configured such that the positive electrode and the side wall of the outer can were electrically connected to each other; the battery of Example 8 could achieve a discharge capacity equivalent to that of the battery in Example 9 including no electrolyte solution absorber.

The present invention may be embodied in other forms without departing from the point and scope of the present invention. The embodiments disclosed in this application are to be considered in all respects as illustrative and not limiting. The scope of the present invention is to be construed on the basis of the recitations in the appended claims rather than the foregoing description, and all changes that come within the range of equivalency of the claims are therefore intended to be embraced therein.

INDUSTRIAL APPLICABILITY

The alkaline battery of the present invention can be used for applications in which conventionally known alkaline batteries (primary or secondary batteries) have been used.

LIST OF REFERENCE NUMERALS

1 Alkaline battery
2 Outer can
3 Sealing plate
4 Positive electrode
5 Negative electrode
6 Separator
7 Gasket
8 Electrolyte solution absorber

The invention claimed is:

1. A positive electrode for alkaline batteries, comprising:
a positive electrode active material comprising silver oxide,
wherein the positive electrode contains tellurium or a compound of tellurium,
wherein the content of tellurium element in the positive electrode is 0.4 parts by mass or more with respect to 100 parts by mass of the total amount of silver element in the positive electrode active material,
wherein the silver oxide contained in the positive electrode active material consists of silver(I) oxide, and
wherein the positive electrode is substantially free of cadmium.

2. The positive electrode according to claim 1,
wherein the content of the tellurium element in the positive electrode is 0.4 parts by mass or more and 10 parts by mass or less with respect to 100 parts by mass of the total amount of the silver element in the positive electrode active material.

3. The positive electrode according to claim 1,
wherein an oxide of tellurium is contained as the compound of tellurium.

4. An alkaline battery comprising power generation components, wherein the power generation components comprises:
a positive electrode containing silver oxide as a positive electrode active material;
a negative electrode;
a separator; and an alkaline electrolyte solution,
wherein at least one of the power generation components contains tellurium or a compound of tellurium,
wherein the total content of tellurium element contained in components housed in the battery is 0.4 parts by mass or more with respect to 100 parts by mass of the total amount of silver element in the positive electrode active material,
wherein the silver oxide contained in the positive electrode active material consists of silver(I) oxide, and
wherein the positive electrode is substantially free of cadmium.

5. The alkaline battery according to claim 4,
wherein the total content of the tellurium element contained in the components housed in the battery is 0.4 parts by mass or more and 10 parts by mass or less with respect to 100 parts by mass of the total amount of the silver element in the positive electrode active material.

6. The alkaline battery according to claim 4,
wherein the positive electrode active material contains silver(I) oxide.

7. The alkaline battery according to claim 4,
wherein an oxide of tellurium is contained as the compound of tellurium.

8. A method for producing the alkaline battery according to claim 5,
the method comprising:
preparing power generation components comprising a positive electrode containing silver oxide as a positive electrode active material, a negative electrode, a separator, and an alkaline electrolyte solution; and
assembling the power generation components into the alkaline battery,
wherein at least one of the power generation components contains tellurium or a compound of tellurium,
wherein the total content of tellurium element contained in components housed in the battery is 0.4 parts by mass or more with respect to 100 parts by mass of the total amount of silver element in the positive electrode active material,
wherein the silver oxide contained in the positive electrode active material consists of silver(I) oxide, and
wherein the positive electrode is substantially free of cadmium.

9. The method according to claim 8,
wherein the alkaline electrolyte solution comprises tellurium or a compound of tellurium dissolved therein.

10. The method according to claim 9,
wherein the content of tellurium element in the alkaline electrolyte solution is 0.1 to 10 mass %.

* * * * *